(12) United States Patent
Crossman

(10) Patent No.: US 6,555,001 B1
(45) Date of Patent: Apr. 29, 2003

(54) ACCELERATED REMEDIATION USING TREE CROPS

(75) Inventor: Tommy Lee Crossman, Springhill, FL (US)

(73) Assignee: Areadis G&M, Highlands Ranch, CO (US)

(*) Notice: Subject to any disclaimer, the term of this patent is extended or adjusted under 35 U.S.C. 154(b) by 0 days.

(21) Appl. No.: 09/823,136

(22) Filed: Mar. 30, 2001

Related U.S. Application Data

(60) Provisional application No. 60/193,522, filed on Mar. 31, 2000.

(51) Int. Cl.[7] .................................................. C02F 3/32
(52) U.S. Cl. ........................ 210/602; 210/747; 111/118
(58) Field of Search .............................. 210/602, 747, 210/170; 111/118

(56) References Cited

U.S. PATENT DOCUMENTS

| 3,925,206 A | * | 12/1975 | Dea |
| 4,839,051 A | * | 6/1989 | Higa |
| 5,947,041 A | * | 9/1999 | Licht |
| 6,250,237 B1 | * | 6/2001 | Licht |
| 6,277,274 B1 | * | 8/2001 | Coffman |

OTHER PUBLICATIONS

Licht, Louis A., Dissertation entitled: *Poplar Tree Buffer Strips Grown in Riparian Zones for Biomass Production and Nonpoint Source Pollution Control*, 1990.

* cited by examiner

Primary Examiner—Fred Prince
(74) Attorney, Agent, or Firm—Standley & Gilcrest LLP

(57) ABSTRACT

A method of remediating contaminated groundwater using tree crops and a method of accelerating the root growth of said tree crops in order to hasten the remediation process. Trees are planted in the soil above an area of contaminated groundwater. At least one trench is placed in the soil near the trees. A conduit is placed into the trench and connected to a supply of a fluid beneficial to the root growth of the trees. The fluid is passed through the conduit, into the trench, and thereafter into the surrounding soil. As it flows outward from the trench, the fluid forms a wetting front that eventually contacts the tree roots and stimulates their growth toward the groundwater below.

20 Claims, 3 Drawing Sheets

ACCELERATED REMEDIATION USING TREE CROPS

This application hereby claims the benefit, under 35 U.S.C. § 119(e), of the Mar. 31, 2000 filing date of United States provisional application Ser. No. 60/193,522, entitled "Accelerated Remediation Using Tree Crops."

BACKGROUND AND SUMMARY OF THE INVENTION

Pollution of groundwater by a variety of contaminants is an important concern. As industry and development of land continues to expand, the potential for contamination increases. Although a variety of precautions may be undertaken to prevent or contain pollutants, it is virtually inevitable that contaminants of some sort will eventually reach an area of groundwater. Therefore, there is a need for an effective method of remediating contaminated groundwater.

Although many technologies have been created to address this problem, the present invention is concerned with utilizing natural crops, and more specifically plantings of trees, to perform remediation. The use of trees in the remediation of groundwater has been used in the past. However, a primary difficulty with such a method is the slow growth rate of the trees. The present invention discloses a method of accelerating the growth of trees planted for the purpose of groundwater remediation.

In a typical remediation process, which utilizes trees, the trees are often planted in dense rows, and at a depth such that the roots are in communication with subsurface groundwater. The present invention contemplates a watering system, whereby one or more trenches are placed in the ground in the area of the tree plantings. A conduit is then placed in each trench for supplying nutrients and water to the soil and roots of the trees in the planting area, thereby creating a wetting zone, which is beneficial to root growth.

BRIEF DESCRIPTION OF THE DRAWINGS

In addition to the novel features and advantages mentioned above, other objects and advantages of the present invention will be readily apparent from the following descriptions of the drawings and preferred embodiments, wherein.

DETAILED DESCRIPTION OF THE PREFERRED EMBODIMENT(S)

The present invention discloses a method of accelerating tree root growth, so that newly planted trees may more quickly be capable of use for the remediation of contaminated groundwater. Trees used for such a purpose generally must be fast growing, and must have a deep root system that is capable of surviving partial or total submergence by the subsurface water table. Because the tree's root system must reach the level of the contaminated subsurface groundwater before the tree may be useful for remediation, the faster the roots can be made to grow, the more effective will be the remediation process.

The method of using trees to assist in the remediation of groundwater has been previously disclosed. For example, U.S. Pat. No. 5,947,041 to Licht recites such a method, and is hereby incorporated by reference herein. Licht describes in detail a preferred method of planting such trees, and illustrates how the nutrient uptake of the trees may help to remove pollutants such as nitrates, ammonianitrogen, and phosphorus.

Figure 1:
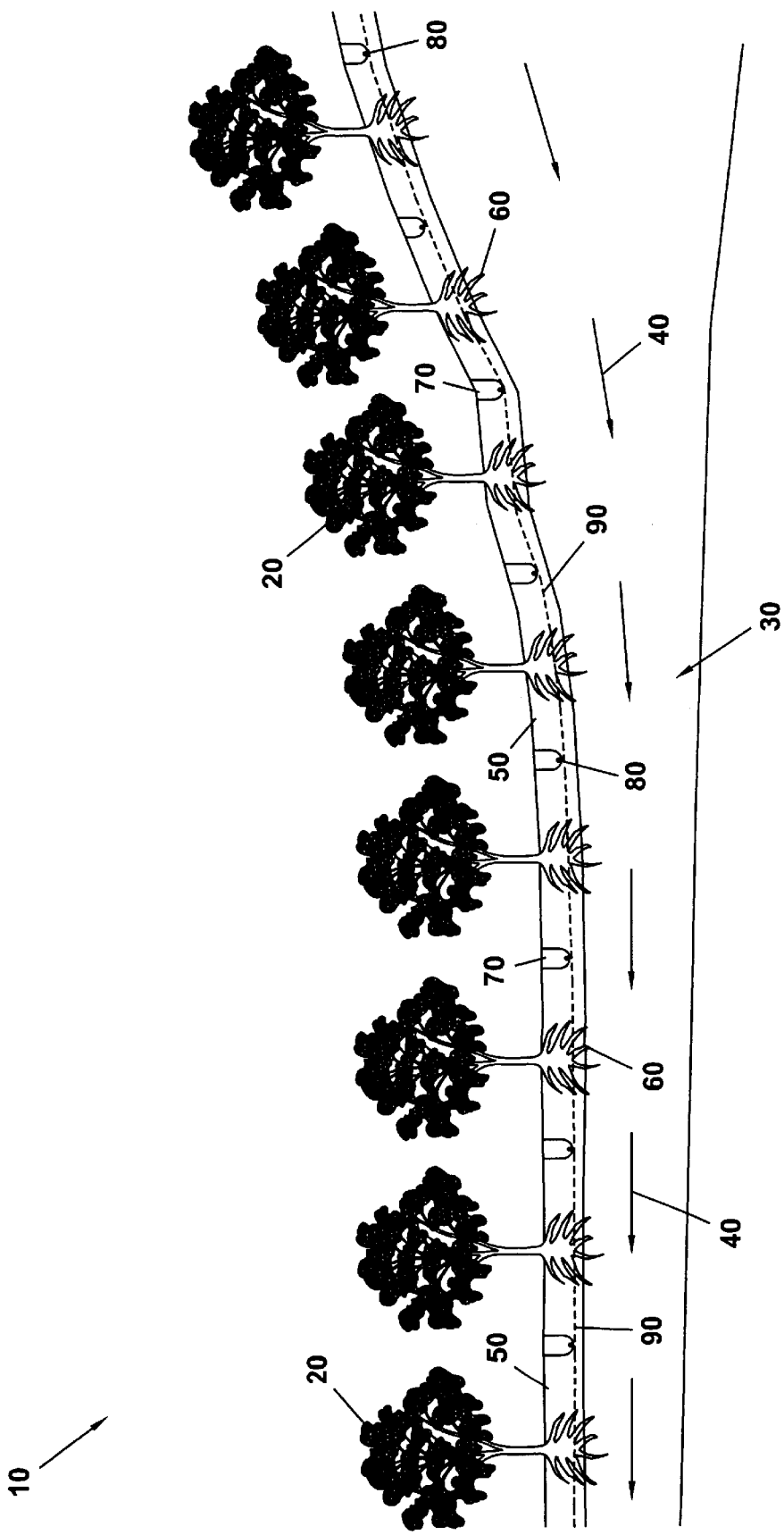
FIG. 1 illustrates a typical tree planting remediation area on a partially sloping terrain, wherein a preferred embodiment of the present invention is utilized to stimulate root growth toward an area of subsurface groundwater.
Figure 2:
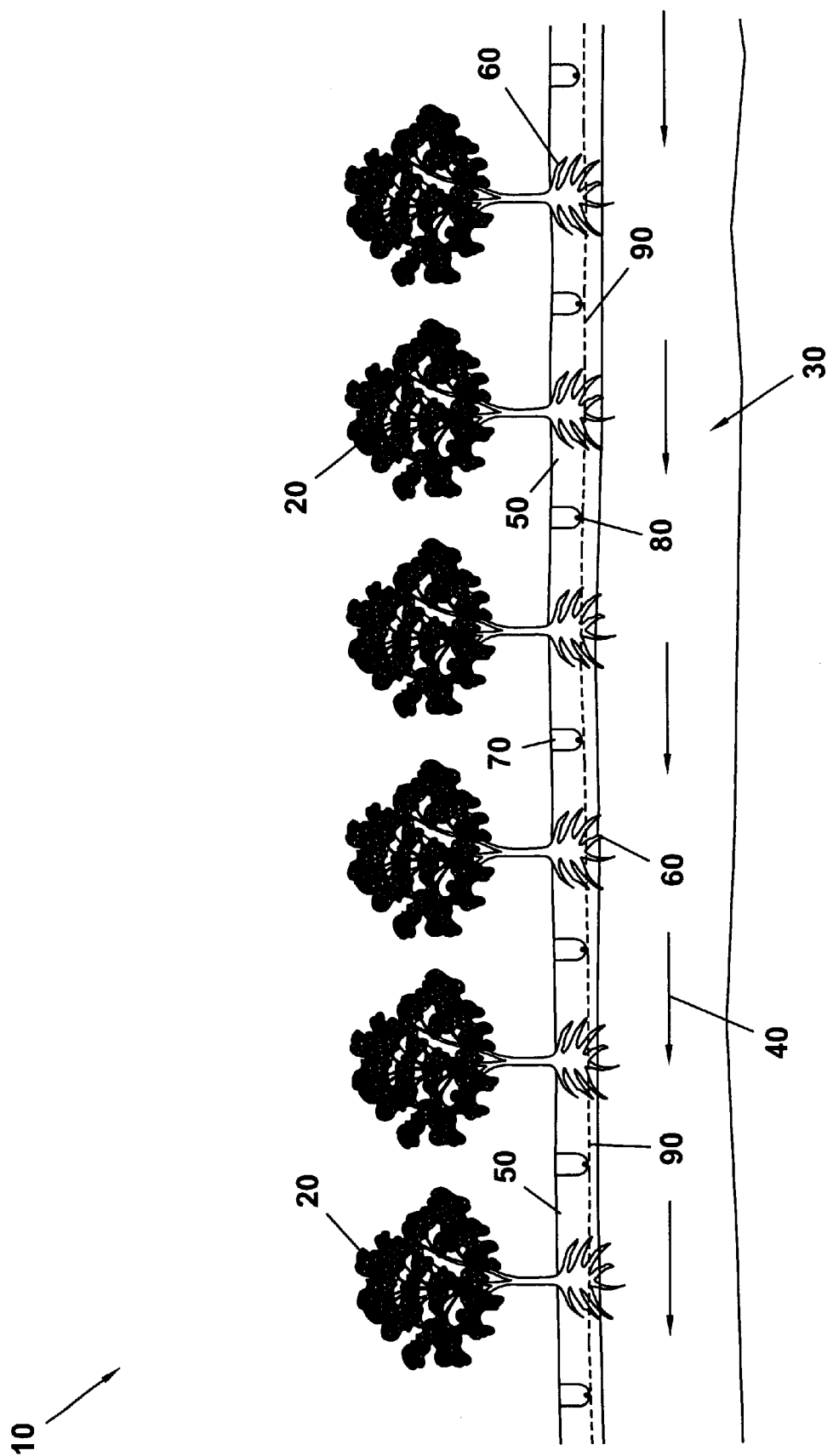
FIG. 2 illustrates a typical tree planting remediation area on a substantially flat terrain, wherein a preferred embodiment of the present invention is utilized to stimulate root growth toward an area of subsurface groundwater.

While the present invention does contemplate such a method of remediation, the present invention is primarily directed at increasing the growth rate of the tree's root system. FIGS. 1 and 2 depict a typical planting 10 of rows of such trees 20. It should be realized that although FIGS. 1 and 2 show only a single row of trees 20, multiple rows of additional trees would typically also exist—in a direction normal to the paper. The trees 20 may be planted on a sloping terrain, such as shown in FIG. 1, or on a substantially flat terrain, as shown in FIG. 2. Such plantings have also found use on landfill caps.

In the present invention, the trees are planted over an area of contaminated groundwater 30. Typically, the trees are planted in rather dense rows, such that the flow 40 of groundwater 30 will pass thereunder. The trees 20 are preferably planted to a depth so that the roots 60 will protrude through the soil and vadose zone and into the groundwater 30. In a preferred embodiment of the present invention, either rooted or pre-rooted stock may be used, and preferably planted to a depth of approximately 12 to approximately 18 inches or deeper if desired.

The present invention involves placing one or more trenches 70 in the soil 50 of the tree planting area. Although the number and placement of the trenches 70 may vary, a trench would typically be placed between each row of trees 20. The trenches 70 may be approximately 3 to 4 feet deep and 12 to 18 inches wide, for example.

Figure 3:
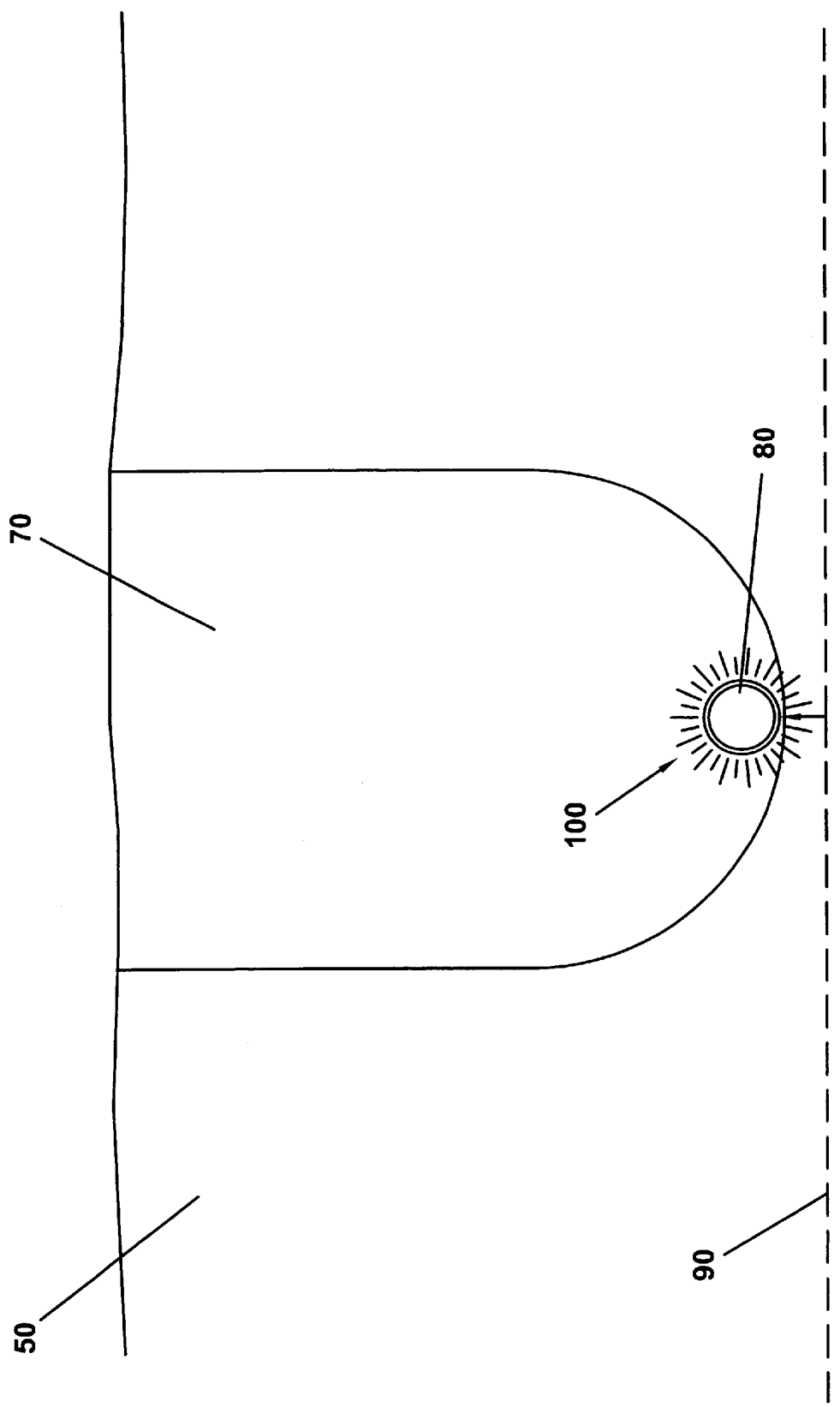
FIG. 3 is an enlarged view, showing the structure of the watering system of the present invention.

As can be seen more clearly by reference to FIG. 3, a conduit 80, such as a plastic pipe, is placed in the bottom of the trench 70. Although the size of the conduit 80 may vary, it has been found that a conduit diameter of approximately one-half inch may produce good results. The conduit is connected to a source of pressurized water 90, so that water may be caused to flow into the conduit 80 in each trench. The flow of water 90 into the conduit may vary depending on the particular conditions prevailing at each planting site. Preferably, the conduit 80 contains multiple orifices or perforations for allowing the water to flow through the conduit and out of the orifices into the surrounding ground, as represented by the dashed lines 100.

Nutrients may be supplied along with the pressurized water 90 to assist in causing the growth of the trees 20. As the pressurized water 90 and nutrients flow out of the conduit 80, they create a wetting front, which soaks into the surrounding soil. The wetting front creates a zone within the ground surrounding the planting area, which allows the roots 60 to grow at an accelerated rate. Thus, by the action of the present invention, the roots 60 may more quickly reach the contaminated area 30 and more efficiently conduct the remediation process.

The scope of the invention is not to be considered limited by the above disclosure, and modifications are possible without departing from the spirit of the invention as evidenced by the following claims:

What is claimed is:

1. A method of remediating contaminated groundwater, said method comprising:

providing at least one trench in a soil above said contaminated groundwater;

placing a conduit suitable for the passage of fluids, into said at least one trench;

planting a plurality of trees above said area of contaminated groundwater and near said at least one trench;

providing a supply of a beneficial fluid through said conduit, such that said fluid passes from said conduit into said trench, and thereafter into said soil; and creating a wetting zone from the flow of said beneficial fluid into said soil, said wetting zone substantially surrounding and contacting said roots of said plurality of trees;

whereby the growth of said roots of said plurality of trees is accelerated, thereby reducing the time required for said roots to reach said groundwater and consequently hastening the start of a remediation process.

2. The method of claim 1, wherein said trench is between about three to about four feet deep.

3. The method of claim 1, wherein said trench is between about twelve to about 18 inches wide.

4. The method of claim 1, wherein said trees consist of rooted stock.

5. The method of claim 1, wherein said trees consist of pre-rooted stock.

6. The method of claim 1, wherein said conduit consists of at least one plastic pipe.

7. The method of claim 6, wherein said plastic pipe is perforated.

8. The method of claim 1, wherein said beneficial fluid is water.

9. The method of claim 8, further comprising nutrients.

10. The method of claim 1, wherein said trees are planted in rows.

11. The method of claim 10, wherein a trench exists between each row of said trees.

12. The method of claim 1, wherein said trees are planted on substantially flat terrain.

13. The method of claim 1, wherein said trees are planted on substantially sloping terrain.

14. The method of claim 1, wherein said trees are planted on a landfill cap.

15. A method of accelerating the root growth of trees used for groundwater remediation:

placing at least one trench in a soil near the location of said trees;

placing a conduit into said at least one trench, said conduit capable of passing fluids into said at least one trench;

connecting to said conduit, a pressurized supply of at least one fluid beneficial to the growth of said roots;

passing said at least one fluid through said conduit and into said trench, said fluid thereafter passing into said soil and forming a wetting front; and producing a wetting zone by an advancement of said wetting front, said wetting zone contacting said roots of said trees.

16. The method of claim 15, wherein said trench is between about three to about four feet deep.

17. The method of claim 15, wherein said trench is between about twelve to about 18 inches wide.

18. The method of claim 15, wherein said conduit consists of at least one plastic pipe.

19. The method of claim 15, wherein said fluid is water.

20. The method of claim 19, further comprising nutrients.

* * * * *

UNITED STATES PATENT AND TRADEMARK OFFICE
CERTIFICATE OF CORRECTION

PATENT NO.   : 6,555,001 B1
DATED        : April 29, 2003
INVENTOR(S)  : Crossman It is certified that error appears in the above-identified patent and that said Letters Patent is hereby corrected as shown below:

<u>Title page,</u>
Item [73], Assignee, please delete " Areadis G&M" and insert -- ARCADIS G&M, Inc. --.

Signed and Sealed this

Twenty-sixth Day of August, 2003

JAMES E. ROGAN
*Director of the United States Patent and Trademark Office*